US010823670B2

(12) United States Patent
Ren et al.

(10) Patent No.: US 10,823,670 B2
(45) Date of Patent: Nov. 3, 2020

(54) COMPACT ULTRAVIOLET LIGHT ADSORPTION SENSING SYSTEM

(71) Applicant: HONEYWELL INTERNATIONAL INC., Morris Plains, NJ (US)

(72) Inventors: Bo Ren, Morris Plains, NJ (US); Yubin Lv, Morris Plains, NJ (US); Junfeng Wang, Morris Plains, NJ (US); Li Wang, Morris Plains, NJ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 35 days.

(21) Appl. No.: 16/343,439

(22) PCT Filed: Oct. 21, 2016

(86) PCT No.: PCT/CN2016/102871
§ 371 (c)(1),
(2) Date: Apr. 19, 2019

(87) PCT Pub. No.: WO2018/072201
PCT Pub. Date: Apr. 26, 2018

(65) Prior Publication Data
US 2019/0277751 A1 Sep. 12, 2019

(51) Int. Cl.
*G01N 21/33* (2006.01)
*G01N 21/64* (2006.01)
(Continued)

(52) U.S. Cl.
CPC ............ *G01N 21/33* (2013.01); *G01N 21/05* (2013.01); *G01N 21/64* (2013.01); *G01N 30/74* (2013.01)

(58) Field of Classification Search
CPC .. G01N 21/05; G01N 30/74; G01N 2030/746; G01N 21/33; G01N 21/64
(Continued)

(56) References Cited

U.S. PATENT DOCUMENTS 6,127,690 A * 10/2000 Kitaoka ................ G01N 21/05
250/573
2003/0025909 A1* 2/2003 Hallstadius ............ G01N 21/33
356/436
(Continued)

FOREIGN PATENT DOCUMENTS

CN 1225449 A 8/1999
CN 104297190 A 1/2005
(Continued)

OTHER PUBLICATIONS

International Search Report and Written Opinion for Application No. PCT/CN2016/102871, dated Jul. 20, 2017, 8 pages.

*Primary Examiner* — Isiaka O Akanbi
(74) *Attorney, Agent, or Firm* — Alston & Bird LLP

(57) ABSTRACT

An ultraviolet (UV) light absorption sensing system (100) includes a UV light source (110) configured to provide a UV sample beam (115) of light toward a still or flowing fluid sample (117) along a central axis (118) of a test cell (120), wherein the central axis (118) is substantially orthogonal to a direction of fluid flow. A reference light source (130) is configured to provide a reference beam (133) along the central axis (118) of the test cell (120). A first detector (140) is positioned to detect a first portion (128) of the UV sample beam (115) and a first portion (138) of the reference beam (133) that traverse the test cell (120). A second detector (142) is positioned to detect a second portion (146) of the UV sample beam (115) and a second portion (148) of the reference beam (133) directly from the UV light source (110) and reference light source (130).

10 Claims, 2 Drawing Sheets

(51) Int. Cl.
*G01N 21/05* (2006.01)
*G01N 30/74* (2006.01)

(58) Field of Classification Search
USPC .................................................. 356/436–437
See application file for complete search history.

(56) References Cited

U.S. PATENT DOCUMENTS

| | | | |
|---|---|---|---|
| 2009/0294702 A1* | 12/2009 | Imanishi | G01N 21/274 250/576 |
| 2018/0238845 A1* | 8/2018 | Eliason | G01N 30/74 |
| 2019/0017872 A1* | 1/2019 | Brunson | G01J 3/0286 |
| 2020/0064262 A1* | 2/2020 | Oki | G01N 21/64 |

FOREIGN PATENT DOCUMENTS

| | | | |
|---|---|---|---|
| CN | 1580739 A | | 2/2005 |
| CN | 1683921 A | | 10/2005 |
| FR | 2637978 A1 | | 4/1990 |
| JP | 0412250 A | | 1/1992 |

\* cited by examiner

COMPACT ULTRAVIOLET LIGHT ADSORPTION SENSING SYSTEM

BACKGROUND

Measurement of water quality in real time may be performed by measuring ultraviolet (UV) absorption of flowing liquid samples. Disadvantages of current measurement systems include their large size and high cost due to the use of one or more beam splitters.

Typical UV measurement systems utilize a UV source and a separate referent light source, and utilize optics, including at least one beam splitter with coating film to re-direct light from both sources through a fluid sample. A detector is used to measure the light from both sources and an algorithm uses the measurements to calculate UV absorption of the fluid sample.

SUMMARY

An ultraviolet (UV) light absorption sensing system includes a UV light source configured to provide a UV sample beam of light toward a still or flowing fluid sample along a central axis of a test cell, wherein the central axis is substantially orthogonal to a direction of fluid flow. A reference light source is configured to provide a reference beam along the central axis of the test cell. A first detector is positioned to detect a first portion of the UV sample beam and a first portion of the reference beam that traverse the test cell. A second detector is positioned to detect a second portion of the UV sample beam and a second portion of the reference beam directly from the UV light source and reference light source.

An ultraviolet (UV) light absorption measurement system includes a UV light source configured to provide a UV sample beam of light toward a still or flowing fluid sample along a central axis of a test cell, wherein the central axis is orthogonal to a direction of fluid flow. An opening is positioned to restrict a beam width of the UV sample beam. A first lens is positioned between the test cell and the UV light source to direct a portion of the UV sample beam of light toward the test cell. A reference light source is configured to provide a reference beam substantially parallel to and close to the UV sample beam. An opening is positioned to restrict a beam width of the reference beam. A second lens is positioned between the test cell and the reference light source to direct a portion of the reference beam of light toward the test cell. A first detector is positioned to detect the UV sample beam and reference beam that traverse the test cell. A second detector is positioned to detect the UV sample beam and reference beam directly from the UV light source and reference light source. A third lens is positioned to receive a portion of the UV sample beam and direct it toward the second detector. A fourth lens is positioned to receive a portion of the reference sample beam and direct the portion of the reference sample beam toward the second detector.

A method includes generating a UV sample beam via a UV light source having a central axis of light extending toward a still or flowing fluid sample along a central axis of a test cell, wherein the central axis is substantially orthogonal to a direction of fluid flow, generating a reference beam via a reference light source having a central axis of light extending along the central axis of the test cell, detecting via a first detector, a first portion of the UV sample beam and reference beam that traverse the test cell, and detecting via a second detector, a second portion of the UV sample beam and reference beam directly from the UV light source and reference light source, wherein the first and second portions of the UV sample beam and reference beam are substantially parallel from their sources to the first and second detectors.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Figure 1:
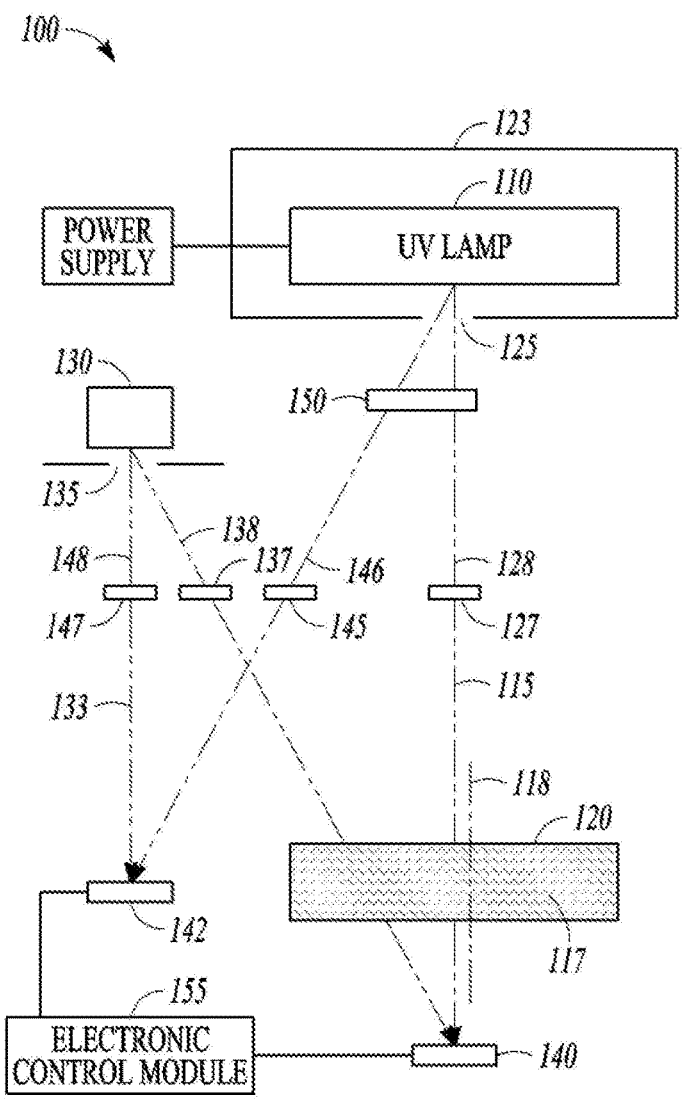
FIG. 1 is a block diagram of system for sensing UV absorption through a fluid in a test cell according to an example embodiment.

In various embodiments, a real-time online solution for UV absorption measurement of static or flowing liquid samples is provided by a UV absorption measurement system 100 having a compact and efficient optical structure as illustrated in FIG. 1. The optical structure allows a significantly smaller measurement optical structure and can greatly reduce the cost of such a structure by eliminating expensive beam splitters.

The ultraviolet (UV) light absorption measurement system 100 includes a UV light source 110, such as a low pressure mercury lamp, or other UV light producing source, configured to provide a UV sample beam 115 of light toward a still or flowing fluid sample 117 along a central axis 118 of a test cell 120, wherein the central axis 118 is orthogonal to a direction of fluid flow and substantially centered through the test cell to ensure a portion of the sample beam passes through a significant amount of the fluid flow. If the test cell is cylindrical in shape, the central axis corresponds to a diameter of the cylindrical test cell.

A shading box 123 is formed around the UV light source 110 in one embodiment with an opening 125 positioned to create the UV sample beam 115 with a desired beam width and direction. The opening 125 may comprise a hole or slit positioned to restrict generated UV light to obtain a beam of desired width. A first lens 127 may be positioned between the test cell 120 and the UV light source 110 to receive and direct a portion 128 of the UV sample beam 115 toward the test cell 120. A reference light source 130 is configured to provide a reference beam 133 substantially parallel to and close to the UV sample beam 115. An opening 135, such as slit or hole, is positioned to restrict the generated light into a beam and provide a desired beam width and direction of the reference beam 133. A second lens 137 is positioned between the test cell 120 and the reference light source 130 to receive and direct a portion 138 of the reference beam 133 toward the test cell 120. Note that the lenses may be single lenses or a battery of lenses in various embodiments.

A first detector 140 is positioned to detect the portions of the UV sample beam 115 and reference beam 133 that traverse the test cell 120. A second detector 142 is positioned to detect a portion of each of the UV sample beam and reference beam directly from the UV light source 110 and reference light source 130. A third lens 145 is positioned to receive a portion 146 of the UV sample beam 115 and direct the portion 146 toward the second detector 142. A fourth lens 147 is positioned to receive a portion 148 of the reference sample beam 133 and direct the portion 148 of the reference sample beam 133 toward the second detector 142.

In one embodiment, the UV light source has a wavelength of approximately 254 nm and the reference light source has a dominant wavelength different than the UV source wavelength and selected to have no or little absorption by the sample. Example reference light sources may include an incandescent lamp or light emitting diode (LED) or other light source capable of producing light having wavelengths greater than approximately 390 nm yet still capable of being detected by the detectors.

A filter 150 may be positioned in a path of the UV sample beam 115 between the UV source 110 and the test cell 120. The filter may be positioned proximate the opening 125 to ensure the entire beam width of the sample beam 115 is filtered, or at least the amount of the beam that will be detected by the first and second detectors. The filter in one embodiment has a dominant wavelength consistent with the UV source of 254 nm, and may have a full width at half maximum (FWHM) of transmittance spectrum of approximately 10 to 20 nanometers. The filter 150 may be used to avoid influence of other wavelengths on measurements.

The test cell and lenses should allow transmittance of UV rays of 254 nm, and may be constructed of materials such as, for example, quartz glass, UV ray transmitting glass or polymer, borosilicate glass, sapphire, $MgF_2$, LiF, and others. Quartz glass is commonly used for UV applications. The lenses may each have an optical axis that is positioned substantially parallel to the central axis 118 of the test cell. The openings 125 and 135 may be positioned close to each respective optical axis.

The light sources and detectors are effectively aligned substantially in parallel such that the optical beams are nearly parallel and close to each other, almost sharing a same beam area. The placement of the light sources and optical components helps to create light beams incident into the flowing liquid close to vertical. In some embodiments, the light beams are as close to vertical as possible for optimal sensing. The placement helps keep the stability and invariability of the optical distance in the liquid (at low concentration, the absorption is proportional to the optical distance), and further may help to reduce the loss of the light. The optical beams are straight and have no deflection through large angles, such as is likely to result from the use of beam splitters, which need not be used in example embodiments. While the beams almost share a same beam area as a result of their alignment, they should share enough area to facilitate calibration and adequate measurement on the detectors such that the UV absorption can be calculated within a desired accuracy.

In some embodiments, the detectors may have areas that are greater than the beam size on the detectors to ensure an entire beam area is detectable. The first and second detectors may comprise UV-enhanced silicon photoelectric cells responsive at 254 nm and dominant wavelength of the reference light source.

A controller 155 may be coupled to the first and second detectors to receive signals representative of measured light from the detectors. The controller 155 may include analog to digital converters if the detector signals are analog in nature to convert the detector signals to digital. The controller may be configured to use the signals representative of measurements from the first and second detectors and calculate UV absorption by the fluid sample. The controller may be further configured to turn the light sources on and off at different times such that the beams do not interfere with each other. The controller is thus configured to temporally alternate provision of the beams such that the detectors only detect one type of light at any given time. A power supply 160 may be included to provide power to components of the system 100. Note that not all connections to the power supply 160 are illustrated to reduce the complexity of representation of the system 100, but would be readily apparent to one of average skill in the art. Power supply 160 may include a ballasting element for the UV source 110, which may include a UV lamp. The ballasting element operates to limit current for the UV lamp, as a resistance of the lamp may decrease with increasing UV light generation.

The following paragraphs describe operation of the UV absorption measuring system 100.

The portions of the beams that are directed toward the two detectors may be characterized as ratios, ratio $R_a$ for UV lamp and ratio $R_b$ for light source 2 (the subscript "a" corresponds to the UV lamp, and the subscript "b" corresponds to light source 2 throughout the description). Before the system leaves factory, the whole system may be calibrated with a blank sample. Assuming the measured light intensity of UV lamp on detector 1 and detector 2 are $I_{a1}$ and $I_{a2}$, respectively. The measured light intensity of light source 2 on detector 1 and detector 2 are $I_{b1}$ and $I_{b2}$, respectively. The ratio $R_a$ is defined by $R_a = I_{a1}/I_{a2}$, and $R_b$ is given by: $R_b = I_{b1}/I_{b2}$. Then the calibrated ratio $R_a$ and $R_b$ are saved in the system.

When a customer uses the system, the UV lamp and light source 2 will be turned on at different times. The customer sample would be input in the flow cell. The measured light intensity on detector 1 and detector 2 are $I_{a1}"$ and $I_{a2}"$ for the UV lamp beam, and $I_{b1}"$ and $I_{b2}"$ for light source 2, respectively.

To better understand the calibration process, a new parameter $I_{a1}"$ is used to represent the light intensity on detector 1 for UV lamp, when the flow cell is injected with blank sample and the surfaces of the flow cell are the same as the one at customer.

Then the transmittance of customer sample is given by:

$$T = \frac{I''_{a1}}{I'_{a1}}$$

Thereof $$\frac{I'_{a1}}{R_a \times I''_{a2}} = f\left(\frac{I''_{b1}}{R_b \times I''_{b2}}\right)$$

The function expression of $f$ is determined in advance before the system leaves the factory.

The absorption of a customer sample is calculated as follows: Abs=−log$_{10}$ (T).

Figure 2:
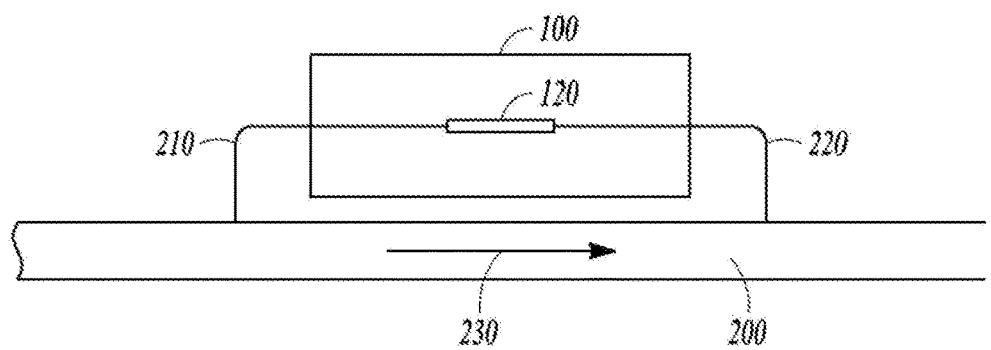
FIG. 2 is a block diagram illustrating the system of FIG. 1 coupled to a pipe having fluid flowing there through according to an example embodiment.

FIG. 2 is a block diagram illustrating use of system 100 to measure a flowing sample from a pipe 200. A first tap 210 is coupled to the pipe 200 at an upstream location. A second tap 220 is coupled to the pipe 200 at a downstream location. The first and second taps are coupled across the test cell 120 and provide a sample of flowing fluid from the fluid flowing through the pipe 200 in a direction indicated by arrow 230. One or more pumps may be used to obtain a desired flow rate in some embodiments.

Figure 3:
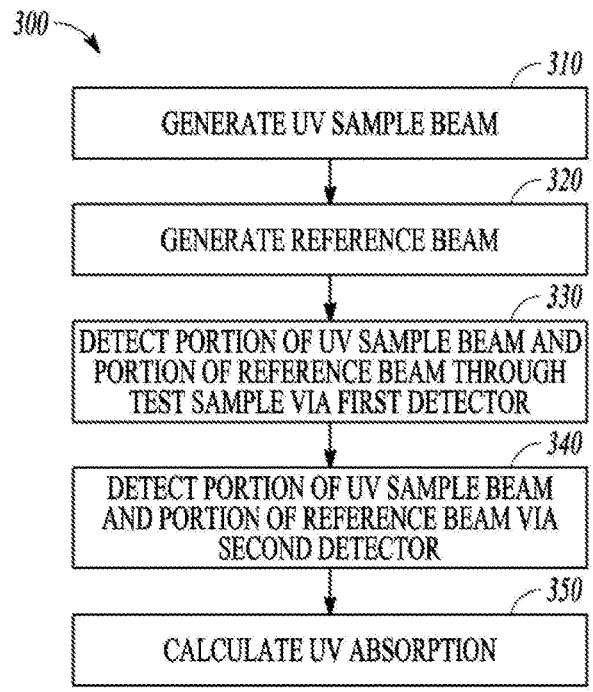
FIG. 3 is a flowchart illustrating UV sensing of a fluid sample according to an example embodiment.

FIG. 3 is a flowchart illustrating a method 300. Method 300 includes generating at 310 a UV sample beam via a UV light source. The sample beam has an axis that is along a central axis of a test cell having flowing fluid, wherein the central axis is substantially orthogonal to a direction of fluid flow. At 320, a reference beam is generated via a reference light source along the central axis of the test cell. At 330, the method 300 includes detecting via a first detector, a first portion of the UV sample beam and reference beam that traverse the test cell. Method 300 further includes detecting at 340 via a second detector, a second portion of the UV sample beam and reference beam directly from the UV light source and reference light source, wherein the first and second portions of the UV sample beam and reference beam are substantially parallel from their sources to the first and second detectors. Since no beam splitters are used in one embodiment, the beams travel directly from their respective sources without being deflected other than by the openings and lenses. At 350, UV absorption of the fluid sample is calculated based on the detecting by the first and second detectors.

In one embodiment, generating the UV sample beam and the reference beam comprises temporally spacing the respective beams such that each beam is detected separately. The UV sample beam may be generated at a wavelength of approximately 254 nm and the reference beam may be generated with a dominant wavelength selected to have no or little absorption by the sample.

Figure 4:
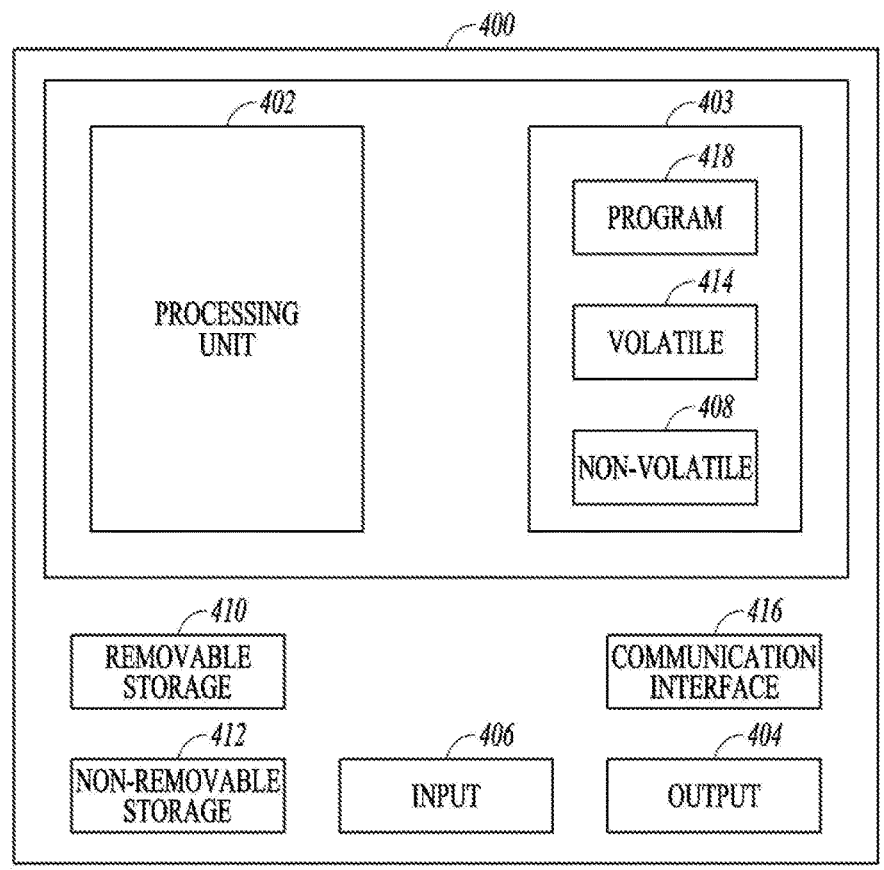
FIG. 4 is a block diagram illustrating electronics for controlling light sources, detectors, and calculating UV absorption of a fluid sample according to an example embodiment.

FIG. 4 is a block schematic diagram of a computer system 400 to execute programming to control the light sources and calculate the absorption of samples according to example embodiments. All components need not be used in various embodiments. One example computing device in the form of a computer 400, may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 400, the storage may also or alternatively include cloud-based storage accessible via a network, such as the Internet.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 400 may include or have access to a computing environment that includes input 406, output 404, and a communication interface 416. Output 404 may include a display device, such as a touchscreen, that also may serve as an input device. The input 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using the communication interface 416 to connect to one or more remote computers, such as database servers, including cloud based servers and storage. The remote computer may include a personal computer (PC), server, router, network PC, a peer device or other common network node, or the like. The communication interface 416 may include a Local Area Network (LAN), a Wide Area Network (WAN), cellular, WiFi, Bluetooth, or other networks.

Computer-readable instructions stored on a computer-readable storage device are executable by the processing unit 402 of the computer 400. A hard drive, CD-ROM, and RAM are some examples of articles including a non-transitory computer-readable medium such as a storage device. The terms computer-readable medium and storage device do not include carrier waves. For example, a computer program 418 may be used to cause processing unit 402 to perform one or more methods or algorithms described herein.

Examples

1. In example 1, an ultraviolet (UV) light absorption sensing system includes a UV light source configured to provide a UV sample beam of light toward a still or flowing fluid sample along a central axis of a test cell, wherein the central axis is substantially orthogonal to a direction of fluid flow. A reference light source is configured to provide a reference beam along the central axis of the test cell. A first detector is positioned to detect a first portion of the UV sample beam and a first portion of the reference beam that traverse the test cell. A second detector is positioned to detect a second portion of the UV sample beam and a second portion of the reference beam directly from the UV light source and reference light source.

2. The system of example 1 and further including multiple optical components positioned with respect to the UV light source and reference light source to control the UV sample beam and reference beam such the UV sample beam and reference beam are nearly parallel and close to each other.

3. The system of example 2 wherein the multiple optical components for each of the UV light source UV sample beam and reference beam includes an opening to define a beam spread for each beam and a lens to focus the beams toward both the first detector and the second detector.

4. The system of any of examples 2-3 wherein the multiple optical components for the UV light source comprises a filter.

5. The system of example 4 wherein the filter has a full width at half maximum (FWHM) of transmittance spectrum of approximately 10 to 20 nanometers.

6. The system of any of examples 1-5 and further comprising a controller coupled to the first and second detectors, wherein the controller is configured to receive the measurements from the first and second detectors and calculate UV absorption by the fluid sample.

7. The system of example 6 wherein the controller is further configured to temporally alternate provision of the beams.

8. The system of any of examples 6-7 wherein the UV light source has a wavelength of approximately 254 nm and the reference light source has a dominant wavelength selected to have no or little absorption by the sample.

9. The system of example 8 wherein the first and second detectors comprise a UV-enhanced silicon photoelectric cell responsive at 254 nm and dominant wavelength of the reference light source.

10. The system of any of examples 1-9 wherein the first and second detectors are positioned relative to each other such that they receive essentially an entire area of the UV sample beam and reference beam.

11. In example 11, an ultraviolet (UV) light absorption measurement system includes a UV light source configured to provide a UV sample beam of light toward a still or flowing fluid sample along a central axis of a test cell, wherein the central axis is orthogonal to a direction of fluid flow. An opening is positioned to restrict a beam width of the UV sample beam. A first lens is positioned between the test cell and the UV light source to direct a portion of the UV sample beam of light toward the test cell. A reference light source is configured to provide a reference beam substantially parallel to and close to the UV sample beam. An opening is positioned to restrict a beam width of the reference beam. A second lens is positioned between the test cell and the reference light source to direct a portion of the reference beam of light toward the test cell. A first detector is positioned to detect the UV sample beam and reference beam that traverse the test cell. A second detector is positioned to detect the UV sample beam and reference beam directly from the UV light source and reference light source. A third lens is positioned to receive a portion of the UV sample beam and direct it toward the second detector. A fourth lens is positioned to receive a portion of the reference sample beam and direct the portion of the reference sample beam toward the second detector.

12. The system of example 11 and further comprising a filter positioned in a path of the UV sample beam between the UV source and the test cell.

13. The system of example 12 wherein the filter has a full width at half maximum (FWHM) of transmittance spectrum of approximately 10 to 20 nanometers.

14. The system of any of examples 11-13 and further comprising a controller coupled to the first and second detectors, wherein the controller is configured to receive the measurements from the first and second detectors and calculate UV absorption by the fluid sample.

15. The system of example 14 wherein the controller is further configured to temporally alternate provision of the beams.

16. The system of any of examples 11-15 wherein the UV light source has a wavelength of approximately 254 nm and the reference light source has a dominant wavelength selected to have no or little absorption by the sample.

17. In example 16, a method includes generating a UV sample beam via a UV light source having a central axis of light extending toward a still or flowing fluid sample along a central axis of a test cell, wherein the central axis is substantially orthogonal to a direction of fluid flow, generating a reference beam via a reference light source having a central axis of light extending along the central axis of the test cell, detecting via a first detector, a first portion of the UV sample beam and reference beam that traverse the test cell, and detecting via a second detector, a second portion of the UV sample beam and reference beam directly from the UV light source and reference light source, wherein the first and second portions of the UV sample beam and reference beam are substantially parallel from their sources to the first and second detectors.

18. The method of example 17 and further comprising calculating a UV absorption of the fluid sample based on the detecting by the first and second detectors.

19. The method of any of examples 17-18 wherein generating the UV sample beam and the reference beam comprises temporally spacing the respective beams such that each beam is detected separately.

20. The method of any of examples 17-19 wherein the UV sample beam is generated at a wavelength of approximately 254 nm and the reference beam is generated with a dominant wavelength selected to have no or little absorption by the sample.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An ultraviolet (UV) light absorption sensing system comprising:
   a UV light source configured to provide a UV sample beam of light toward a still or flowing fluid sample along a central axis of a test cell, wherein the central axis is substantially orthogonal to a direction of fluid flow;
   a reference light source configured to provide a reference beam along the central axis of the test cell;
   a first detector positioned to detect a first portion of the UV sample beam and a first portion of the reference beam that traverse the test cell; and
   a second detector positioned to detect a second portion of the UV sample beam and a second portion of the reference beam directly from the UV light source and reference light source.

2. The system of claim 1 and further comprising:
   multiple optical components positioned with respect to the UV light source and reference light source to control the UV sample beam and reference beam such the UV sample beam and reference beam are nearly parallel and close to each other.

3. The system of claim 2 wherein the multiple optical components for each of the UV light source UV sample beam and reference beam comprise:
 an opening to define a beam spread for each beam; and
 a lens to focus the beams toward both the first detector and the second detector.

4. The system of claim 2 wherein the multiple optical components for the UV light source comprises a filter having a full width at half maximum (FWHM) of transmittance spectrum of approximately 10 to 20 nanometers.

5. The system of claim 1 and further comprising a controller coupled to the first and second detectors, wherein the controller is configured to receive the measurements from the first and second detectors and calculate UV absorption by the fluid sample.

6. The system of claim 1 wherein the UV light source has a wavelength of approximately 254 nm and the reference light source has a dominant wavelength selected to have no or little absorption by the sample.

7. The system of claim 1 wherein the first and second detectors are positioned relative to each other such that they receive essentially an entire area of the UV sample beam and reference beam.

8. An ultraviolet (UV) light absorption measurement system comprising:
 a UV light source configured to provide a UV sample beam of light toward a still or flowing fluid sample along a central axis of a test cell, wherein the central axis is orthogonal to a direction of fluid flow;
 an opening to restrict a beam width of the UV sample beam;
 a first lens positioned between the test cell and the UV light source to direct a portion of the UV sample beam of light toward the test cell;
 a reference light source configured to provide a reference beam substantially parallel to and close to the UV sample beam;
 an opening to restrict a beam width of the reference beam;
 a second lens positioned between the test cell and the reference light source to direct a portion of the reference beam of light toward the test cell;
 a first detector positioned to detect the UV sample beam and reference beam that traverse the test cell;
 a second detector positioned to detect the UV sample beam and reference beam directly from the UV light source and reference light source;
 a third lens positioned to receive a portion of the UV sample beam and direct it toward the second detector; and
 a fourth lens positioned to receive a portion of the reference sample beam and direct the portion of the reference sample beam toward the second detector.

9. The system of claim 8 and further comprising a controller coupled to the first and second detectors, wherein the controller is configured to receive the measurements from the first and second detectors and calculate UV absorption by the fluid sample.

10. A method comprising:
 generating a UV sample beam via a UV light source having a central axis of light extending toward a still or flowing fluid sample along a central axis of a test cell, wherein the central axis is substantially orthogonal to a direction of fluid flow;
 generating a reference beam via a reference light source having a central axis of light extending along the central axis of the test cell;
 detecting via a first detector, a first portion of the UV sample beam and reference beam that traverse the test cell; and
 detecting via a second detector, a second portion of the UV sample beam and reference beam directly from the UV light source and reference light source, wherein the first and second portions of the UV sample beam and reference beam are substantially parallel from their sources to the first and second detectors.

* * * * *